(12) United States Patent
Koenig et al.

(10) Patent No.: US 6,509,433 B2
(45) Date of Patent: Jan. 21, 2003

(54) FLUORINE-CONTAINING BLOCKED ISOCYANATES

(75) Inventors: Eberhard Koenig, Leverkusen (DE); Beate Baumbach, Leverkusen (DE); Christian Füssel, Tönisvorst (DE); Juan Gonzalez-Blanco, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/955,228

(22) Filed: Sep. 14, 2001

(65) Prior Publication Data

US 2002/0123642 A1 Sep. 5, 2002

(30) Foreign Application Priority Data

Sep. 20, 2000 (DE) .......................... 100 46 473

(51) Int. Cl.$^7$ .................. C08G 18/38; C08G 18/80; C08G 18/77; C07C 271/10; C07C 269/02
(52) U.S. Cl. ................. 528/45; 252/182.2; 252/182.22; 528/49; 528/67; 528/70; 560/115; 560/157; 560/158; 560/167; 560/330; 560/336; 560/349; 560/356
(58) Field of Search ............................. 528/45, 49, 67, 528/70; 252/182.2, 182.22; 560/115, 157, 158, 167, 330, 336, 349, 356

(56) References Cited

U.S. PATENT DOCUMENTS

| | | | |
|---|---|---|---|
| 4,806,585 A | 2/1989 | Nakayama et al. | 524/376 |
| 5,496,642 A | 3/1996 | Martinez et al. | 428/423.1 |
| 5,541,281 A | 7/1996 | Yeske et al. | 528/70 |
| 5,576,411 A | 11/1996 | Yeske et al. | 528/70 |
| 5,777,061 A | 7/1998 | Yonek et al. | 528/45 |

Primary Examiner—Rabon Sergent
(74) Attorney, Agent, or Firm—Joseph C. Gil; Thomas W. Roy

(57) ABSTRACT

The present invention relates to blocked fluorine-containing polyisocyanates which have a fluorine content, calculated as F=19, of 1.0 to 20.0 wt. %, preferably 4.0 to 10.0 wt. %, and are suitable for preparing stoving coatings having a water- and soil-repellent surface, wherein the fluorine-containing polyisocyanates are based on the reaction product of aliphatic polyisocyanates or polyisocyanate mixtures having an NCO content of 10 to 25 wt. % and a functionality of at least 2.5 with monofunctional isocyanate blocking agents and a fluorinated monoalcohols wherein i) 75 to 95 equivalent-% of the isocyanate groups are reacted with isocyanate blocking agents, ii) 5 to 25 equivalent-% of the isocyanate groups are reacted with fluorinated monoalcohols and iii) the equivalents of i) and ii) add up to 100%.

The present invention also relates to a process for the preparation of these blocked fluorine-containing polyisocyanates and to their use as crosslinking agents in the preparation of polyurethane plastics, especially polyurethane coatings.

7 Claims, 1 Drawing Sheet

Angle greater than 90°:

Angle less than 90°:

FLUORINE-CONTAINING BLOCKED ISOCYANATES

BACKGROUND OF THE INVENTION

1. Field of the Invention

The present invention relates to new fluorine-containing blocked polyisocyanates, their preparation and their use for the preparation of polyurethane plastics, preferably as crosslinking components for stoving lacquers, in particular for coil coatings.

2. Description of the Prior Art

The formulation of blocked polyisocyanates with OH-containing polycondensates or polymers (polyesters or polyacrylates) to give binders for "one-component" stoving lacquers or stoving coating compositions is known. The incorporation of fluorine into lacquer binders for the purpose of achieving a particular water- and soil-repellent coating is also prior art.

There are various publications in the patent literature in which fluorine is mentioned as a modifying component either in the OH or in the NCO component of coating compositions.

Blocked polyisocyanates with a content of incorporated fluorine are described, for example, in the U.S. Pat. Nos. 5,541,281 and 5,576,411. These are polyisocyanates with allophanate, isocyanurate and urethane groups which are prepared by the reaction of fluorine-substituted alcohols and monomeric diisocyanates. It is understood that the preparation of fluorine-containing polyisocyanates from the base isocyanates is a relatively expensive process, inter alia, because of the thin film distillations to be carried out to remove the starting isocyanates (purification). Also, it must be taken into account that such fluorine-containing isocyanates have a limited field of use and are therefore so-called niche products.

It is an object of the present invention to provide an alternative solution for the preparation of fluorine-containing polyisocyanates. An alternative to the known route is the modification of commercially available lacquer polyisocyanates with fluoro-alcohols. It is an additional object of the present invention to provide fluorine-containing blocked polyisocyanates from conventional lacquer polyisocyanates by a simple process, which can be employed for the preparation of polyurethane plastics, preferably stoving lacquers with a water- and soil-repellent surface.

This object may be achieved with the blocked polyisocyanates according to the invention.

SUMMARY OF THE INVENTION

The present invention relates to blocked fluorine-containing polyisocyanates which have a fluorine content, calculated as F=19, of 1.0 to 20.0 wt. %, preferably 4.0 to 10.0 wt. %, and are suitable for preparing stoving coatings having a water- and soil-repellent surface, wherein the fluorine-containing polyisocyanates are based on the reaction product of aliphatic polyisocyanates or polyisocyanate mixtures having an NCO content of 10 to 25 wt. % and a functionality of at least 2.5 with monofunctional isocyanate blocking agents and fluorinated monoalcohols wherein i) 75 to 95 equivalent-% of the isocyanate groups are reacted with isocyanate blocking agents, ii) 5 to 25 equivalent-% of the isocyanate groups are reacted with fluorinated monoalcohols and iii) the equivalents of i) and ii) add up to 100%.

The present invention also relates to a process for the preparation of blocked fluorine-containing polyisocyanates by initially introducing polyisocyanates, optionally in a solvent, into a reaction vessel at a temperature of 50 to 70° C. with stirring, then adding a monofunctional fluorine-substituted alcohol and carrying out the reaction at 80 to 110° C. until the calculated NCO content is obtained, and then reacting the remaining NCO groups with the corresponding amount of blocking agent at 70 to 100° C. until NCO groups are then no longer detected, e.g. by means of the IR spectrum.

The present invention additionally relates to the use of the fluorine-containing blocked polyisocyanate according to the invention as a crosslinking agent in the preparation of polyurethane plastics.

The present invention finally relates to substrates which are coated with lacquers containing the blocked fluorine-containing polyisocyanates according to the invention.

DETAILED DESCRIPTION OF THE INVENTION

Figure 1:
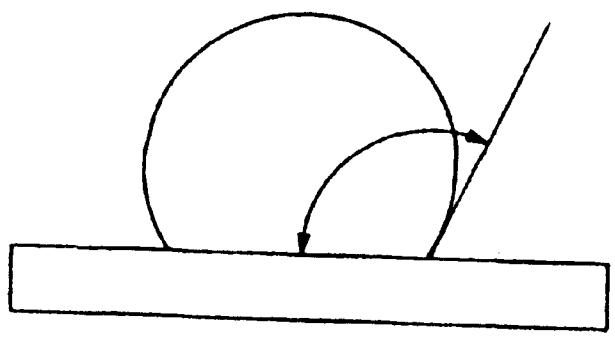
FIG. 1 represents a water wetting angle of greater than 90°.

It is essential to the invention that the new blocked polyisocyanates are prepared from three components aliphatic polyisocyanates, NCO blocking agents and fluorinated aliphatic monoalcohols.

In addition, the blocked polyisocyanates can also contain known additives, such as solvents, flow agents [e.g., Acronal 4F (BASF) or Tego Protect 5002 (Goldschmidt)], antioxidants or stabilizers against thermal yellowing. Additional examples are described in EP-A 0 829 500 (U.S. Pat. No. 6,242,530, herein incorporated by reference).

Suitable lacquer polyisocyanates which may be used to prepare the polyisocyanates according to the invention are known and include lacquer polyisocyanates prepared from (cyclo)-aliphatic diisocyanates, with an NCO content of 12 to 25 wt. % and containing biuret, isocyanurate, allophanate, iminooxadiazinedione (asymmetric trimer), urethane and/or uretdione groups. Examples of aliphatic and cycloaliphatic diisocyanates include 1,6-diisocyanatohexane (HDI), 1-isocyanato-3,3,5-trimethyl-5-isocyanato-methyl-cyclohexane (isophorone-diisocyanate or IPDI), bis-(4-isocyanatocyclohexyl)-methane [$H_{12}$ MDI (Desmodur W, Bayer AG)], 2,6- and 2,5-bisisocyanato-norbomane, 1,4-bis-isocyanatomethyl-cyclohexane and 1,3- or 1,4-tetramethylxylylene-diisocyanate. Polyisocyanates which contain predominantly isocyanurate groups and are prepared from 1,6-diisocyanatohexane, IPDI and/or $H_{12}$ MDI are preferred.

Suitable blocking agents include oximes such as butanone oxime; secondary aliphatic amines such as diisopropylamine; CH-acid compounds such as malonic or acetoacetic esters; NH-acid heterocyclic compounds such as 1,2,4-triazole, imidazole or 3,5-dimethylpyrazole; lactams such as ε-caprolactam; alcohols such as methanol, ethanol or n-propanol; and mixtures of these blocking agents. ε-Caprolactam, diisopropylamine or ethanol are particularly preferred.

Suitable fluorine containing alcohols for preparing the polyisocynates according to the invention include aliphatic or cycloaliphatic alcohols having a molecular weight of 150 to 500 and a fluorine content of 30 to 80 wt. %. Preferred are the addition products of perfluoroethyl iodide, perfluorobutyl iodide or perfluorohexyl iodide onto allyl alcohol to give the corresponding fluorinated alcohols. Especially preferred are pentafluoropentan-1-ol (M 178, fluorine content: 53%), nonafluoroheptan-1-ol ($C_7H_7F_9O$, M 278, F=61.5%) and undecafluorononan-1-ol (M 378, F=55%), are preferred. 4,4,5,5,6,6,7,7,7-nonafluoroheptan-1-ol is most preferred and may be obtained according to the following literature reference: N. O. Brace, J. Fluorine Chem. 1982, 20, 313–328.

The fluorine-containing blocked polyisocyanates according to the invention are preferably used as crosslinking agents (components) for the preparation of binders for polyurethane lacquers.

For the preparation of a storage-stable lacquer binder from the polyisocyanates according to the invention as the crosslinking agent and e.g. an OH component, the preferred equivalent ratio of blocked NCO groups:OH groups is 1:1. Suitable isocyanate-reactive components are the OH- and/or NH-containing components known from polyurethane chemistry and preferably from lacquer technology. Examples include OH group-containing poly(meth)acrylate resins, polyester polyols, polyesterurethanes, (poly)aminoalcohols and polyamines.

The lacquer binders contain the fluorinated blocked polyisocyanates according to the invention, OH- and/or NH-containing crosslinking components, and optionally known additives.

The lacquers prepared with the fluorine-containing blocked polyisocyanates according to the invention as crosslinking agents impart to the resulting coating surface water-repellent and consequently self-cleaning properties. They are used for coating any desired substrates, such as stone, masonry, concrete, wood, glass, ceramic, plastics and metals. They are preferably used for coating metal sheets, such as vehicle body components.

On the one hand, the water wetting angle and the critical angle of inclination are used as physical measurement parameters for evaluating these properties. Apparatuses for measuring water wetting angles are commercially available.

The water wetting angle of a drop of water on a lacquer surface provides information about the degree of wetting of the drop on the lacquer. The water wetting angle itself arises from projecting a tangent on the drop lying on a flat surface. If the curvature of the drop is a hemisphere, this tangent forms an angle of 90° with the lacquer surface (FIG. 1). On water-repellent surfaces, for the same volume the drop is pushed away more by the surface, the wetting area becomes smaller and the water wetting angle measured is greater than 90°. In the extreme case, such as with drops of mercury, contact with the surface takes place only at one point. The wetting angle is then 180°.

Figure 2:
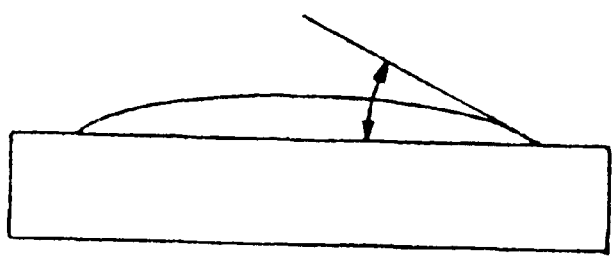
FIG. 2 represents a water wetting angle of less than 90°.

Wetting angles of <90° (FIG. 2) result with water drops which run and no longer have a spherical shape but a dome-like shape.

It has been found by experiment that on surfaces with a water wetting angle of >90° and the lowest possible angle of inclination at which the drop starts to roll off, the dirt taken up is transported away with the water rolling off.

The fluorinated blocked polyisocyanates according to the invention can be prepared in a simple manner with the lacquer polyisocyanates available on a large industrial scale. With the new crosslinking agents, it is possible to obtain coil coating lacquers with good water- and dirt-repellent properties, as is illustrated in more detail in the following examples.

EXAMPLES

Example 1

Preparation of 4,4,5,5,6,6,7,7,7-nonafluoroheptan-1-ol

The perfluorinated alcohol was prepared by a process known from the literature by free-radical addition of commercially available perfluorobutyl iodide onto allyl alcohol and subsequent hydro-deiodination with lithium aluminium hydride (N. O. Brace. J. Fluorine Chem. 1982, 20, 313–328).

This alcohol was a colorless liquid (b.p.$_{50\ mbar}$ 83–85° C.) with a molecular weight of 278 and a fluorine content of 171 g or 61.5%.

Example 2

According to the Invention

Preparation of a blocked polyisocyanate crosslinking agent with the perfluoro-alcohol according to example 1

Batch:

| | |
|---|---|
| 58.8 g (0.3 eq.) | of an isocyanurate-containing lacquer polyisocyanate based on 1,6-diisocyanatohexane (HDI) with an NCO content of 21.4%, a viscosity at 23° C. of approx. 3,000 mPas and a functionality (F) of approx. 3.5 |
| 245.0 g (0.7 eq.) | of an isocyanurate-containing lacquer polyisocyanate based on 1-isocyanato-3,3,5-trimethyl-5-isocyanatomethyl-cyclohexane (IPDI) with an NCO content of 12.0% and dissolved to 70% in Solvent Naphtha 100, F = 3.2 |
| 27.8 g (0.1 eq.) | perfluoro-alcohol according to example 1 |
| 102.0 g (0.9 eq.) | ε-caprolactam |
| 80.0 g | 1-methoxy-propyl acetate (MPA) |
| 80.0 g | isobutanol |
| 593.6 g (0.9 eq.) | blocked NCO groups |

| | |
|---|---|
| Solids content (calc.): | 60.6% |
| Fluorine content based on solids: | 17.1 g or 4.7% |
| Viscosity at 23° C.: | approx. 850 mPas |
| Blocked NCO equivalent (calc.): | 660 g |

Procedure:

The two polyisocyanates, MPA and the perfluoro-alcohol were heated to 100° C., while stirring. The mixture was subsequently stirred at 100° C. for approx. 1 hour until the NCO content reached the calculated value of 9.2% or was just below this level. The total amount of solid caprolactam was then introduced and the mixture was subsequently stirred at 110° C. until, after approx. 2 hours, an NCO content was no longer detected by IR spectroscopy. Isobutanol was added, the mixture was allowed to cool and the crosslinking agent solution characterized above with a blocked NCO equivalent of 660 g was obtained.

Example 3

Comparison

Using the polyisocyanate component according to example 2 and ε-caprolactam, an analogous crosslinking agent was prepared, but without the perfluoro-alcohol. This crosslinking agent had a solids content of 65% and a blocked NCO equivalent of 528 g.

Example 4

According to the Invention

The preparation of coil coating binders and coil coating clear lacquers and the testing of these stoving lacquers is described.

a) Binders

Binder I

| Components | Equivalent weight [g] | Solids | F content based on solids [g]/[%] | Amount for the lacquer batch [based on 100 wt. %] |
|---|---|---|---|---|
| Alkynol 1665[1] | 1,000 | 650.0 | — | 45.5 |
| Crosslinking agent according to example 2 | 660 | 360.1 | 17.1/4.7 | 30.0 |
| Binder I | | 1,010.1 | 17.1/1.69 | 75.5 |

Binder I contains 1.69 wt. %, based on the solids, of fluorine in incorporated form.

Binder II

| Components | Equivalent weight [%] | Solids [g] | Amount for the lacquer batch [based on 100 wt. %] |
|---|---|---|---|
| Alkynol 1665[1] | 1,000 | 650.00 | 48.0 |
| Crosslinking agent according to example 3 (comparison) | 528 | 343.2 | 25.3 |

[1]Alkynol 1665, polyester polyol, 65% in Solvent Naphtha 100/isobutanol, 1.7 wt. % OH groups, available from Bayer AG
Binder II contains no bonded fluorine.

b) Composition of the clear lacquers

| Clear lacquer components | Lacquer I | Lacquer II (comparison) |
|---|---|---|
| Alkynol 1665 | 45.5 | 48.0 |
| Crosslinking agent according to example 2 | 30.0 | — |
| Crosslinking agent according to example 3 | — | 25.3 |
| | 4.3 | 6.1 |
| | — | 19.2 |
| CAB 531-1[2] 10% in SN 200 S[3] | 9.4 | — |
| Solvent Naphtha 100 | 9.4 | — |
| Diacetone alcohol | 1.4 | 1.4 |
| 1-Methoxypropyl acetate | | |
| Dibutyltin dilaurate[4], 10% in SN 100 | | |
| Total amount [parts by wt.] | 100.0 | 100.0 |
| Solids content [%] | approx. 48 | approx. 48 |
| Fluorine per lacquer batch [%] | 0.85 | — |

[2]Cellulose acetobutyrate, Krahn Chemie Hamburg, manufacturer Eastman Chemicals, Kingsport/U.S.A.
[3]Solvent Naphtha, Deutsche Exxon Chemica GmbH, Cologne
[4]Air Products, U.S.A.

The clear lacquer batches were mixed homogeneously by means of a Skandex mixer. The lacquers were adjusted to the processing viscosity (approx. 70 sec DIN 4/23° C.) by the addition of Solvent Naphtha 200 S.

The clear lacquers were applied by knife-coating onto chromated aluminium sheets (1 mm thick). Immediately after application of the lacquer, the sheets/lacquers were stoved in an Aalborg oven on a turntable at an oven temperature of 350° C. After a residence time of 38 sec at 350° C., an object temperature (PMT) of 232° C. was established. Before application of the above clear lacquers in a dry layer thickness of 8 to 10 μm, a brown-pigmented base lacquer layer (19 to 22 μm) was applied.

c) Clear lacquer properties

| | Lacquer I | Lacquer II (comparison) |
|---|---|---|
| Water wetting angle | 99.4° | 74.0° |
| Critical angle of inclination | 28° | 36° |
| Entrainment of carbon black[2] | 100% | 30% |
| Flow [0 = very good; 5 = poor] | 0 | 0 |
| Layer thickness [μm] (ECCA-T1)[1] | 0 | 0 |
| Gardner gloss 20°/60° (ECCA-T2)[1] | 61/90 | 58/89 |
| MEK wiping test, double strokes 2 kg (ECCA-T11 and DIN EN 12720) | 100 W | 100 W |
| Micro-hardness 10–30 sec/30 sec release | 6.0/5.0 | 5.9/4.3 |
| | 80 | 80 |
| Impact test inch/lb (ECCA-T5) | 0 | 0 |
| Adhesion 6 mm in # (ECCA-T6) | 0.5 T | 0.5 T |
| T-bend test adhesion normal (ECCA-T7) | 0.5 T | 0.5 T |
| T-bend test elasticity normal (ECCA-T7) | | |

[1]ECCA: By the method of the European Coil Coating Association
[2]Manual experiment to test the self-cleaning properties
0.1 g Flame Black 101 (Degussa) was sprinkled on the lacquer surface. A drop of water weighing approx. 0.1 g was applied above the soiling and was caused to move by inclining the metal sheet.

The uptake of carbon black was evaluated visually after a running time of the drop of 5 cm.

As can be seen from the above, the lacquer properties were equally good for the two clear lacquers. The two lacquers differ only in the water-repellent properties. The fluorine-containing lacquer I had a significantly higher water wetting angle, i.e. the wetting area of the drop of water was smaller, and a lower angle of inclination than the comparison lacquer, i.e. the tendency to roll off and therefore the self-cleaning of the surface was promoted. This could be demonstrated with the aid of the uptake of carbon black by a drop of water with the "Manual experiment to test the self-cleaning properties" described above. On the fluorine-containing lacquer I, the complete amount of carbon black was entrained (entrainment 100%) up to saturation of the drop of water after a running time of 5 cm. On the comparison lacquer II, carbon black remained, especially at the edges of the running track, and the entrainment was only approx. 30%. The fluorine-containing coating thus clearly shows self-cleaning properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A blocked fluorine-containing polyisocyanate which has a fluorine content, calculated as F=19, of 1.0 to 20.0 wt. % and is suitable for preparing stoving coatings having a water- and soil-repellent surface, wherein the fluorine-containing polyisocyanate comprises the reaction product of an aliphatic polyisocyanate or polyisocyanate mixture having an NCO content of 10 to 25 wt. % and a functionality of at least 2.5 with a monofunctional isocyanate blocking agent and a fluorinated monoalcohol, which comprises the addition product of perfluoroethyl iodide, perfluorobutyl iodide or perfluorohexyl iodide onto allyl alcohol with subsequent hydro-deiodination to give the corresponding fluorinated alcohol wherein i) 75 to 95 equivalent-% of the isocyanate groups are reacted with an isocyanate blocking agent, ii) 5 to 25 equivalent-% of the isocyanate groups are reacted with said fluorinated monoalcohol and iii) the equivalents of i) and ii) add up to 100%.

2. The blocked fluorine-containing polyisocyanate of claim 1 wherein the blocked fluorine-containing polyisocyanate has a fluorine content, calculated as F=19, of 4.0 to 10.0 wt. %.

3. A polyurethane plastic prepared from the blocked fluorine containing polyisocyanate of claim 1 and an isocyanate-reactive component.

4. A polyurethane coating composition containing the blocked fluorine-containing polyisocyanate of claim 1 and an isocyanate-reactive component.

5. A coated substrate prepared from the polyurethane coating composition of claim 4.

6. The coated substrate of claim 5 wherein the substrate is metal.

7. A process for the preparation of a blocked fluorine-containing polyisocyanate, which has a fluorine content, calculated as F=19, of 1.0 to 20.0 wt. % and is suitable for preparing stoving coatings having a water- and soil-repellent surface, which comprises initially introducing an aliphatic polyisocyanate or polyisocyanate mixture, optionally in a solvent, into a reaction vessel at a temperature of 50 to 70° C. with stirring, subsequently adding a fluorinated monoalcohol, which comprises the addition product of perfluoroethyl iodide, perfluorobutyl iodide or perfluorohexyl iodide onto allyl alcohol with subsequent hydro-deiodination to give the corresponding fluorinated alcohol, reacting the mixture at 80 to 110° C. until the calculated NCO content is reached and then reacting the remaining NCO groups with a corresponding amount of blocking agent at 70 to 110° C.

* * * * *